(12) United States Patent
Pan et al.

(10) Patent No.: US 10,782,562 B1
(45) Date of Patent: Sep. 22, 2020

(54) LIGHT EMITTING ASSEMBLY, BACKLIGHT SOURCE, DISPLAY PANEL AND LIGHT EMITTING DIODE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Fei Pan, Beijing (CN); Yucheng Li, Beijing (CN); Hening Zhang, Beijing (CN); Shikang Ge, Beijing (CN); Xufeng Tu, Beijing (CN); Wei Dai, Beijing (CN); Xueqiang Gao, Beijing (CN); Xu Li, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/538,784

(22) Filed: Aug. 12, 2019

(30) Foreign Application Priority Data

Feb. 28, 2019 (CN) .......................... 2019 1 0150014

(51) Int. Cl.
*G02F 1/13357* (2006.01)
*G02F 1/35* (2006.01)
(52) U.S. Cl.
CPC .. *G02F 1/133605* (2013.01); *G02F 1/133603* (2013.01); *G02F 2001/3509* (2013.01)

(58) Field of Classification Search
CPC .................... G02F 1/133605; G02F 1/133603
See application file for complete search history.

(56) References Cited

U.S. PATENT DOCUMENTS

| | | | | |
|---|---|---|---|---|
| 9,678,383 B1* | 6/2017 | Peterson | ........... | H01L 21/67144 |
| 2011/0051411 A1* | 3/2011 | Kim | .................. | G02F 1/133603 362/235 |
| 2015/0219966 A1* | 8/2015 | Song | .................. | G02F 1/133603 362/97.3 |
| 2015/0323729 A1* | 11/2015 | Takatori | ............ | G02F 1/133603 362/606 |
| 2017/0123271 A1* | 5/2017 | Kim | .................. | G02F 1/133603 |
| 2018/0062047 A1* | 3/2018 | Biwa | ..................... | H01L 33/486 |
| 2018/0172221 A1* | 6/2018 | Kim | ........................ | H01L 33/58 |
| 2019/0129251 A1* | 5/2019 | Watanabe | .............. | G02B 5/206 |
| 2019/0212613 A1* | 7/2019 | Yasunaga | ........... | G02F 1/133605 |

* cited by examiner

*Primary Examiner* — William N Harris
(74) *Attorney, Agent, or Firm* — Kinney & Lange, P.A.

(57) ABSTRACT

A light emitting assembly, a backlight source and a display panel are provided. The light emitting assembly includes: a circuit board, at least one LED on the circuit board; the at least one LED has a main light emitting face substantially parallel to the circuit board and An oblique side light emitting face, the side light emitting face being located between the main light emitting face and the side light emitting face; a reflective film between the circuit board and the at least one LED; an acute angle is formed between the main light emitting face and the side light emitting face, and the side light emitting face is configured such that light emitted by the side light emitting face is directed away from the LED and is directed toward the circuit board, the reflective film being configured to reflect light emitted by the side light emitting face.

20 Claims, 3 Drawing Sheets

LIGHT EMITTING ASSEMBLY, BACKLIGHT SOURCE, DISPLAY PANEL AND LIGHT EMITTING DIODE

CROSS-REFERENCE TO RELATED APPLICATION

The present application claims the benefit of Chinese Patent Application No. 201910150014.4 filed on Feb. 28, 2019 in the China National Intellectual Property Administration, the whole disclosure of which is incorporated herein by reference.

TECHNICAL FIELD

The present disclosure relates to the field of light emitting technology, and in particular to a light emitting assembly, a backlight source, and a display panel.

BACKGROUND

A LCD (Liquid Crystal Display) screen does not emit light by itself. In order to ensure that contents displayed on the LCD display screen may be seen clearly, a certain backlight source is needed. In a backlight source of the related art, there is a difference in light intensity between the position at a gap between two adjacent light emitting diodes (LEDs) and a light emitting position, which difference may cause a display failure.

SUMMARY

According to an aspect of the present disclosure, there is provided a light emitting assembly comprising: a circuit board; at least one light emitting diode on one side of the circuit board; the at least one light emitting diode comprising a main light emitting face substantially parallel to the circuit board and a side light emitting face disposed obliquely, the side light emitting face being between the main light emitting face and the circuit board; an angle between the main light emitting face and the side light emitting face is an acute angle, a reflective film between the circuit board and the at least one light emitting diode; wherein the side light emitting face is configured such that light emitted by the side light emitting face is directed away from the light emitting diode and is directed toward the circuit board; the reflective film is configured to reflect light emitted by the side light emitting face.

In some embodiments, in the at least one of the light-emitting diodes, the side light emitting face is an encirclement of at least three inclined light emitting sub-faces, and among a plurality of light-emitting diodes, two adjacent light-emitting diodes are arranged close to each other at two respective light emitting sub-faces facing towards each other, and bottom edges of the two respective light emitting sub-faces are parallel to each other, while a gap is provided between top edges of the two respective light emitting sub-faces.

In some embodiments, the side light emitting face of the at least one of the light emitting diodes is an encirclement of four inclined light emitting sub-faces, and the bottom edges of the four inclined light emitting sub-faces are of square structures, and a plurality of square structures are in a matrix arrangement.

In some embodiments, an angle between the at least one of the light emitting sub-faces and the circuit board is in a scope of 30-60 degrees.

In some embodiments, an angle between each of the light emitting sub-faces and the circuit board is an angle of 45 degrees.

In some embodiments, an area of each of the light emitting sub-faces is ½ of an area of the main light emitting face.

In some embodiments, the light emitting assembly further comprises a first wafer and a second wafer, the first wafer is disposed on the main light emitting face; and the second wafer is disposed on the side light emitting face.

In some embodiments, the light emitting assembly further comprises a fluorescent layer on surfaces of the first wafer and the second wafer.

In some embodiments, each of the light emitting diodes further comprises a bracket, and each of the light emitting diodes is connected to the circuit board through the bracket.

In some embodiments, each of the light emitting diodes further comprises a package structure for packaging the first wafer and the second wafer.

In some embodiments, the package structure is a packaging adhesive.

In some embodiments, the bracket is made of a conductive material.

According to another aspect of the present disclosure, there is provided a backlight source comprising the light emitting assembly mentioned above.

According to yet another aspect of the present disclosure, there is provided a display panel comprising the backlight source mentioned above.

According to yet another aspect of the present disclosure, there is provided a light emitting diode comprising a main light emitting face and a side light emitting face, wherein the side light emitting face is an encirclement of at least three light emitting sub-faces inclined with respect to the main light emitting face, the side light emitting face and the main light emitting face are together in a substantially truncated pyramid shape, wherein the main light emitting face is a larger one of two bottom faces of the truncated pyramid shape.

In some embodiments, a fluorescent layer is provided on the main light emitting face and the side light emitting face.

In some embodiments, the light emitting diode further comprises a bracket disposed on a smaller one of the two bottom surfaces of the truncated pyramid shape, the light emitting diode being connected to the circuit board by the bracket.

In some embodiments, the light emitting diode further comprises a package structure for packaging the main light emitting face and the side light emitting face.

In some embodiments, the light emitting diode further comprises a first wafer and a second wafer, the first wafer being disposed on the main light emitting face and the second wafer being disposed on the side light emitting face.

In some embodiments, the first wafer and the second wafer are of one unitary piece.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some of embodiments of the present disclosure. Other drawings may also be obtained by those of ordinary skill in the art without any inventive efforts.

DETAILED DESCRIPTION OF EMBODIMENTS

Figure 1:
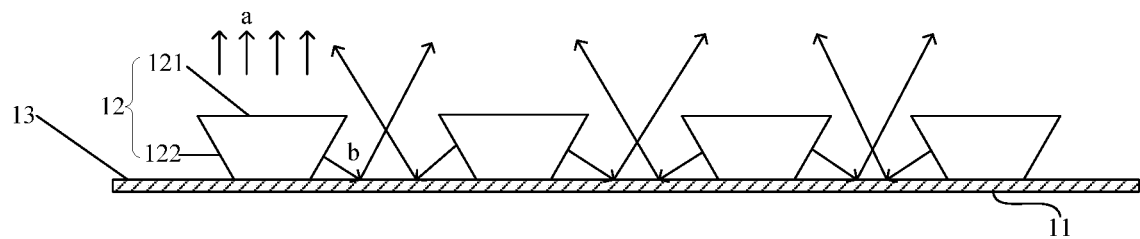
FIG. 1 is a schematic structural diagram of a light emitting assembly according to an embodiment of the present disclosure.

The technical solutions in the embodiments of the present disclosure are clearly and completely described in the following with reference to the accompanying drawings in the embodiments of the present disclosure. It is obvious that the described embodiments are only some of the embodiments of the present disclosure, instead of all of the embodiments. All other embodiments obtained by those skilled in the art based on the embodiments of the present disclosure without departing from the inventive scope are within the scope of the disclosure.

In the description of the present disclosure, it is to be appreciated that the orientation or positional relationship indicated by the terms "center", "upper", "lower", "front", "back", "left", "right", "vertical", "horizontal", "top", "bottom", "inside", "outside" and the like is based on the orientation or positional relationship shown in the drawings, which is merely used for the convenience of describing the present disclosure and simplifying the description, rather than indicating or implying that the device or element referred to must have a particular orientation, or is constructed and operated in a particular orientation, and thus it is not to be construed as limiting the present disclosure. In the description of the present disclosure, expression "a plurality of" means two or more unless otherwise stated.

In a small-sized LCD display or a medium-sized LCD display, a white light LED (Light Emitting Diode) is generally used as a backlight source of the LCD. With a requirement for higher quality of display screens on the market, such as a wider color gamut, a higher resolution, a higher contrast, and an even higher level in slimming and lightening, a Mini LED (mini LED) backlight source came into being.

Currently, each LED particle in a Mini LED backlight source typically comprises only one light emitting wafer, and a light emitting direction of the light emitting wafer is perpendicular to a light emitting surface of the backlight source. Among a plurality of LEDs in the Mini LED backlight source, there is a difference between an light intensity at each of respective light emitting positions of two adjacent light emitting diodes (LEDs) and an light intensity at a position of a gap between the two adjacent light emitting diodes (LEDs), which tends to cause a hot spot phenomenon and then a poor display quality of pictures displayed on the screen. A current way to remedy the defect is to increase the number of LEDs so as to reduce the gap between two adjacent LEDs, resulting in a higher cost, and a heat dissipation problem which is difficult to solve.

In an embodiment of the present disclosure, a light emitting assembly is provided, as shown in FIG. 1, including a circuit board 11, and a plurality of LEDs 12 disposed on the circuit board 11; each of the LEDs 12 includes a main light emitting face 121 parallel to the circuit board 11 and an inclined side light emitting face 122 which is disposed obliquely to face toward the circuit board 11 such that the light emitted by the side light emitting face 122 is directed away from the LED 12 and is directed toward the circuit board 11, and the circuit board 11 is provided with a reflective film 13 for reflecting the light emitted by the side light emitting face 122.

Figure 2:
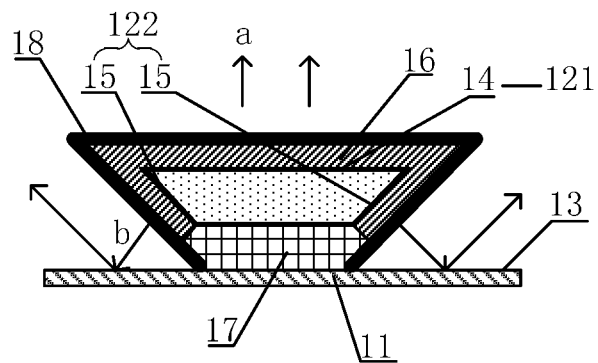
FIG. 2 is a schematic view of a structure in which an LED is disposed on a circuit board according to an embodiment of the present disclosure.

In the embodiment shown in FIG. 2, the main light emitting face 121 may be constituted by a first wafer 14 parallel to the circuit board 11, and the side light emitting face 122 may be formed by an encirclement of a plurality of second wafers 15 which are inclined with respect to the circuit board, and thus the main light emitting face 121 and the side light emitting face 122 form a multi-faced light emitting wafer LED 12.

The first wafer 14 and the second wafer 15 can be prepared by an epitaxy technique, so that the first wafer 14 and the second wafer 15 can be integrally formed.

Further referring to FIGS. 1 and 2, the light emitting direction of the first wafer 14 (i.e., the direction indicated by an arrow a in FIG. 2) is perpendicular to the light emitting face of the first wafer 14, that is, the light emitted by the first wafer 14 is projected in a front view direction in a direction perpendicular to the circuit board 11. The light emitting direction of the second wafer 15 (i.e., the direction indicated by an arrow b in FIG. 2) is perpendicular to the light emitting face of the second wafer 15, that is, the light emitted from the second wafer 15 is obliquely irradiated downwards onto the reflective film 13, an then is reflected by the reflective film 13, and is next projected into the front view direction through the gap between the two adjacent LEDs 12, such that the light intensity at the position of the gap between the two adjacent LEDs 12 can be increased, thereby reducing the difference between the light intensity at the position of the gap between the two adjacent LEDs 12 and the light intensity at the light emitting position of the main light emitting face of each of the LED 12.

Optionally, further referring to FIG. 2, the light emitting assembly may further include a fluorescent layer 16 formed on the surface of an entirety formed collectively by both the first wafer 14 and the second wafer 15, that is, the first wafer 14 and the second wafer 15 which are integrated formed, such that a white light LED can be obtained.

Further optionally, further referring to FIG. 2, each of the LEDs 12 further includes a bracket 17 and a package structure 18 for packaging the first wafer 14 and the second wafer 15; each LED is connected to the circuit board 11 by the bracket 17.

The package structure 18 may be a packaging adhesive coated between the first wafer 14 and the second wafer 15 for packaging the two. The material of the bracket 17 may be a conductive material, and each of the LEDs 12 may be soldered onto the circuit board 11 through the bracket 17.

In an embodiment of the present disclosure, a light emitting assembly is provided. An arrangement is provided in which a side light emitting face 122 is disposed on each of the circuit board 11 and the side light emitting face 122 is inclined toward the circuit board 11 and the reflective film 13 for reflecting light emitted by the side light emitting face 122 is provided on the circuit board 11. Light emitted from the side light emitting face 122 is irradiated onto the reflective film 13, and then is reflected by the reflective film 13, and is next projected into the front view direction through the gap between the two adjacent LEDs 12. Compared with the LED 12 of the related art which includes only one main light emitting face, the light intensity at the gap position between the two adjacent LEDs can be increased in the present disclosure, the difference in light intensity between the position at a gap between two adjacent LEDs and the light emitting position of each of the LEDs (which refers to the light emitting position of the main light emitting face of the related art) is reduced, thereby avoiding the hot spot phenomenon and reducing the poor display quality of pictures displayed on the screen due to the hot spot phenomenon.

The specific structure of the side light emitting face 122 in each of the LEDs 12 is not limited, as long as the light emitted from the side light emitting face 122 of each LED can be reflected by the reflective film 13 and then it can be emitted through the position of the gap between the LEDs 12 adjacent thereto.

Figure 3:
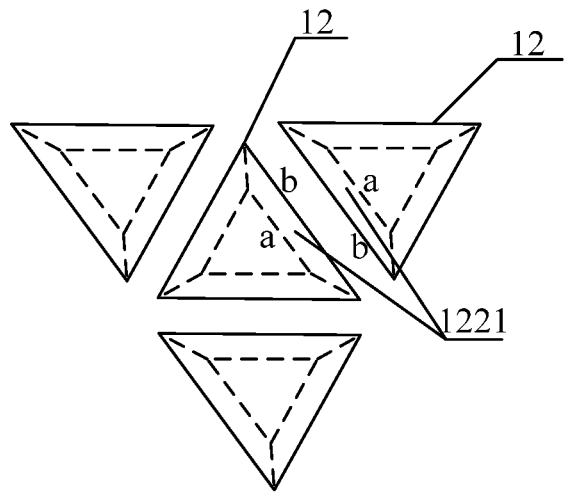
FIG. 3 is a schematic structural diagram of an arrangement of a plurality of LEDs according to an embodiment of the present disclosure, wherein adjacent LEDs are arranged close to each other at two respective light emitting sub-faces facing towards each other, and bottom edges of the two respective light emitting sub-faces are parallel to each other.
Figure 4:
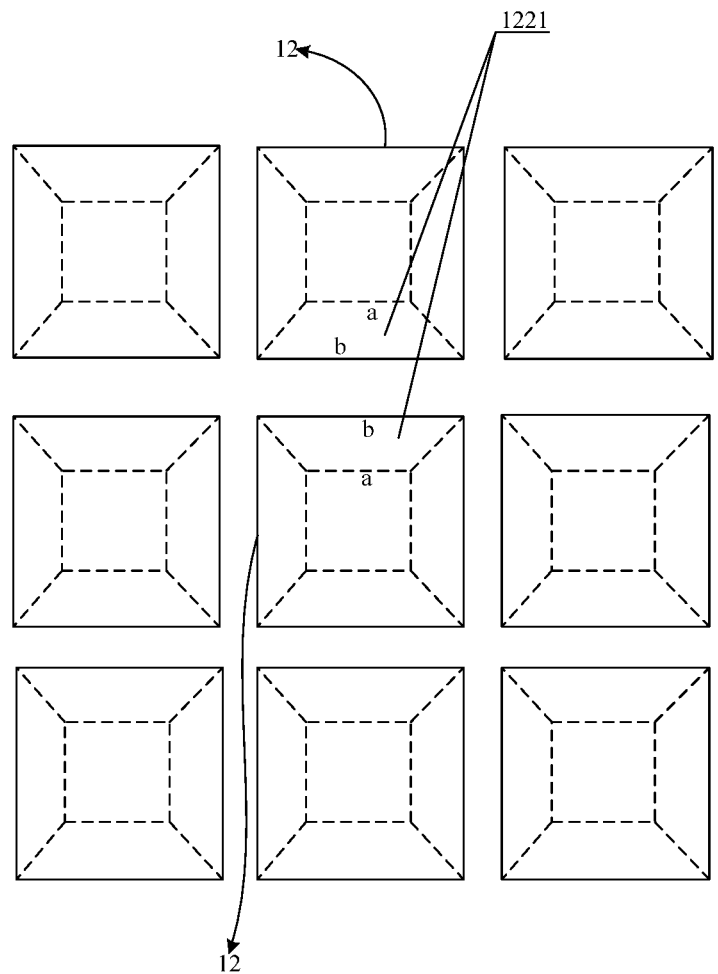
FIG. 4 is a schematic structural diagram of another arrangement of a plurality of LEDs according to an embodiment of the present disclosure, wherein adjacent LEDs are arranged close to each other at two respective light emitting sub-faces facing towards each other, and bottom edges of the two respective light emitting sub-faces are parallel to each other.

In an embodiment of the present disclosure, referring to FIG. 3 and FIG. 4, in each of the LEDs 12, the side light emitting face 122 is formed by an encirclement of at least three inclined light emitting sub-faces 1221. Among the plurality of LEDs 12, any two adjacent LEDs are arranged close to each other at two respective light emitting sub-faces thereof facing towards each other, and bottom edges (indicated by the line segments a in FIG. 3 and FIG. 4) of the two light emitting sub-faces 1221 are parallel to each other, while a gap is provided between top edges (indicated by the line segments b in FIG. 3 and FIG. 4) of the two light emitting sub-faces 1221, wherein the two light emitting sub-faces 1221 respectively belong to the two adjacent two light-emitting diodes.

The side light emitting face 122 may be formed by an encirclement of three inclined light emitting sub-faces 1221. As shown in FIG. 3, each of the LEDs 12 is in a shape of a triangular frustum pyramid, and the top surface and the bottom surface thereof are inverted upside down and then soldered to the circuit board 11. The side light emitting face 122 may be formed by an encirclement of four inclined light emitting sub-faces 1221. As shown in FIG. 4, each of the LEDs 12 is in a shape of a quadrangular frustum pyramid, and the top surface and the bottom surface are inverted and soldered to the circuit board 11.

Figure 5:
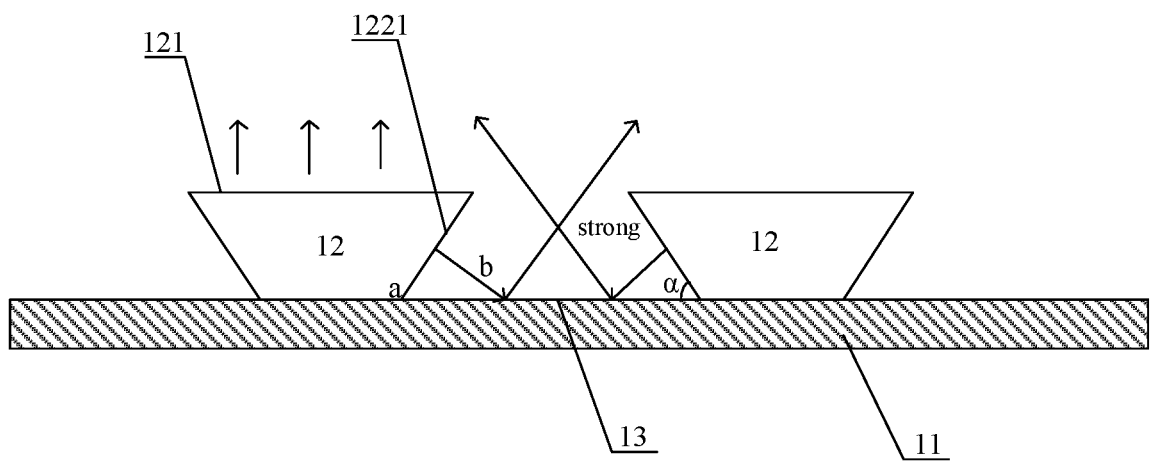
FIG. 5 is a schematic diagram of the light emitted by respective light emitting sub-faces of two adjacent LEDs in the arrangement of FIG. 4 being reflected and superimposed on each other according to an embodiment of the present disclosure.

In the embodiment of the present disclosure, since among a plurality of light-emitting diodes 12, two adjacent light-emitting diodes are arranged close to each other at two respective light emitting sub-faces thereof facing towards each other, and bottom edges of the two light emitting sub-faces are parallel to each other, and the two light emitting sub-faces 1221 respectively belong to the adjacent two light-emitting diodes, then, a case in which each of the plurality of LEDs 12 in the plurality of light-emitting diodes 12 is in a hexahedron structure as shown in FIG. 4 is taken as an example. As shown in FIG. 5, in any two adjacent LEDs 12 of the plurality of LEDs 12, the light emitting directions of the two light emitting sub-faces 1221 that are close to each other and face towards each other (as indicated by an arrow b in FIG. 5) are both perpendicular to the bottom edges of the two light emitting sub-faces 1221 (the edges shown by a in FIGS. 4 and 5, which are perpendicular to the paper surface in FIG. 5). As such, the light emitted by the two light emitting sub-faces 1221 which are close to each other and face towards each other are propagated in a plane perpendicular to the two light emitting sub-faces 1221 and perpendicular to the bottom edges (a plane parallel to the paper surface), and the light rays are reflected by the reflective film 13 and are superimposed at the position of the gap between the two adjacent LEDs 12 to form a strong light, so that the light intensity at the position of the gap between the two adjacent LEDs 12 may be enhanced maximally, thereby reducing the difference among light intensities at different positions as a whole, and avoiding a poor display quality of pictures displayed on the screen.

In an example of the present disclosure, as shown in FIG. 4, the side light emitting face of each LED 12 is formed by an encirclement of four inclined light emitting sub-faces 1221, and the bottom edges of the four inclined light emitting sub-faces 1221 form collectively a square structure. A plurality of square structures are arranged in a matrix.

In the embodiment of the present disclosure, the side light emitting face 122 of each LED 12 is formed by an encirclement of four inclined light emitting sub-faces 1221, and the bottom edge a of the four inclined light emitting sub-faces 1221 form a square structure, that is, the structure shown in FIG. 4. Each of the LEDs 12 is in a shape of a quadrangular frustum pyramid, and the top surface and bottom surface thereof are inverted upside down and then soldered to the circuit board 11. Since a plurality of the square structures are arranged in a matrix, then, by further referring to FIGS. 4 and 5, the light emitted by each of the light emitting sub-faces 1221 of each LED, and the light emitted by one of the light emitting sub-faces 1221 of the adjacent LEDs in upper, lower, left, and right directions are irradiated between the two adjacent LEDs, and the light rays are reflected in a plane perpendicular to the bottom edges of the two light emitting sub-faces 1221 and superimposed to form strong light, so that the light intensity at the gap position between the two adjacent LEDs 12 may be enhanced maximally, thereby reducing the difference in light intensity at different positions.

The angle between the light emitting sub-face 1221 and the circuit board 11 is not specifically limited.

In an embodiment of the present disclosure, as shown in FIG. 5, the angle α between each of the light emitting sub-faces 1221 and the circuit board 11 is between 30-60 degrees. Due to the case where the polygonal structure formed by the bottom edges of the side light emitting face 122 in each LED 12 as well as the height of each LED 12 (i.e., a distance between the bottom surface and the top surface) are determined, as the angle α between the light emitting sub-face 1221 and the circuit board 11 decreases, the area of the main light emitting face 121 gradually increases, the gap between the two adjacent LEDs 12 decreases, and the production area of each LED 12 increases, which is disadvantageous for reducing the cost. On the other hand, as the angle α between the light emitting sub-face 1221 and the circuit board 11 increases, the area of the main light emitting face 121 gradually decreases, the gap between the two adjacent LEDs 12 increases, and the production area of each LED 12 increases, which is disadvantageous for reducing the difference in the light intensity between the two adjacent LEDs 12 and the light-emitting position of the main light emitting face 121 of each LED 12. By limiting the angle α between each of the light emitting sub-faces 1221 and the circuit board 11 within the range as above, it is possible to reduce the difference in the light intensity between the two adjacent LEDs 12 and the light-emitting position of the main light emitting face 121 of each LED 12 while reducing the cost thereby avoiding hot spot phenomenon.

In still another alternative embodiment of the present disclosure, the angle α between each of the light emitting sub-faces 1221 and the circuit board 11 is 45 degrees. It is possible to reduce the cost while reduce the difference in the light intensity between the position at a gap between two adjacent LEDs 12 and a light emitting position of the main light emitting face 121 of each of the LED 12 of the two adjacent LEDs 12, thereby avoiding the hot spot phenomenon maximally.

In still another embodiment of the present disclosure, as shown in FIG. 5, the area of each of the light emitting sub-faces 1221 is ½ of the area of the main light emitting face 121.

In the embodiment of the present disclosure, in a condition where a light loss during the reflection process is not taken into account, since the area of each of the light emitting sub-faces 1221 is ½ of the area of the main light emitting face 121, then, in a condition where the two adjacent LEDs 12 are completely identical to each other (being same in the term of shape and size), the light rays emitted from the two light emitting sub-faces 1221 that are close to each other and face towards each other are reflected and then superimposed on each other, so that the light intensity at the position of the gap between the two adjacent LEDs 12 and the light intensity of the main light emitting face 121 of each LEDs 12 tend to be uniform.

Figure 6:
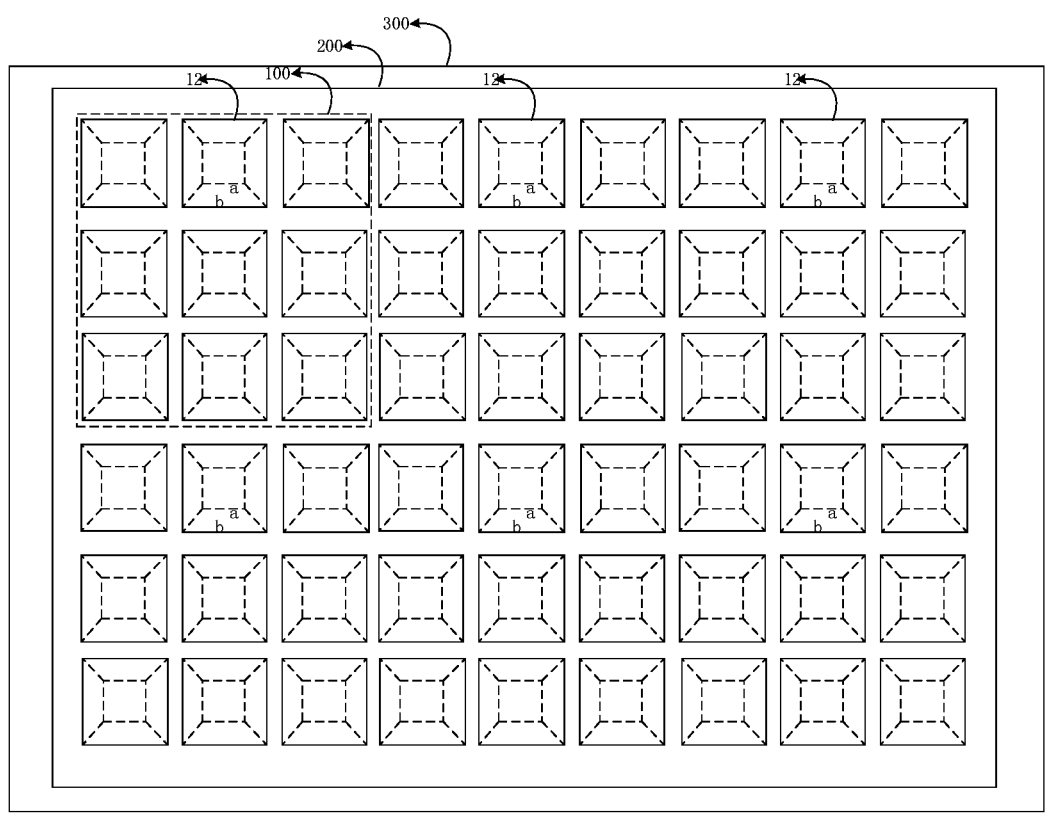
FIG. 6 is a schematic diagram of a display panel which comprises a backlight source that has a plurality of light emitting assemblies with the arrangement in FIG. 4.

Embodiments of the present disclosure also provide a backlight source, including the light emitting assembly as described above. FIG. 6 is a schematic diagram of a display panel 300 which comprises a backlight source 200 that has a plurality of light emitting assemblies 100 with the arrangement in FIG. 4.

The beneficial effects of the backlight source provided by the embodiment of the present disclosure are the same as those of the light-emitting assembly provided by the above technical solution, and details are not described herein again.

Embodiments of the present disclosure also provide a display panel including the backlight source as described above.

The beneficial effects of the display panel provided by the embodiment of the present disclosure are the same as those of the light-emitting assembly provided by the above technical solution, and are not described herein again.

The above is only the specific embodiment of the present disclosure, but the scope of the present disclosure is not limited thereto, and variations or substitutions of which those skilled in the art may readily think within the technical scope of the present disclosure should be covered within the protective scope of the present disclosure. Therefore, the protective scope of the present disclosure should be determined by the scope of the claims.

What is claimed is:

1. A light emitting assembly, comprising:
    a circuit board;
    at least one light emitting diode on one side of the circuit board, the at least one light emitting diode comprising a main light emitting face substantially parallel to the circuit board and a side light emitting face disposed obliquely, the side light emitting face being between the main light emitting face and the circuit board, an angle between the main light emitting face and the side light emitting face being an acute angle; and
    a reflective film between the circuit board and the at least one light emitting diode;
    wherein the side light emitting face is configured such that light emitted by the side light emitting face is directed away from the at least one light emitting diode and is directed toward the circuit board; and
    wherein the reflective film is configured to reflect light emitted by the side light emitting face.

2. The light emitting assembly according to claim 1, wherein the at least one light emitting diode comprises a plurality of light-emitting diodes, and wherein:
    in at least some of the plurality of light-emitting diodes, the side light emitting face is an encirclement of at least three inclined light emitting sub-faces, and among the plurality of light-emitting diodes, two adjacent light-emitting diodes are arranged close to each other with two respective light emitting sub-faces facing towards each other, and bottom edges of the two respective light emitting sub-faces are parallel to each other, while a gap is provided between top edges of the two respective light emitting sub-faces.

3. The light emitting assembly according to claim 2, wherein:
    the side light emitting face of the at least some of the light emitting diodes is an encirclement of four inclined light emitting sub-faces, and the bottom edges of the four inclined light emitting sub-faces are of square structures, and a plurality of square structures are in a matrix arrangement.

4. The light emitting assembly according to claim 2, wherein:
    an angle between the at least one of the light emitting sub-faces and the circuit board is in a range of 30-60 degrees.

5. The light emitting assembly according to claim 4, wherein:
    an angle between each of the light emitting sub-faces and the circuit board is 45 degrees.

6. The light emitting assembly according to claim 2, wherein:
    an area of each of the light emitting sub-faces is ½ of an area of the main light emitting face.

7. The light emitting assembly according to claim 1, further comprising a first wafer and a second wafer, wherein:
    the first wafer is disposed on the main light emitting face; and
    the second wafer is disposed on the side light emitting face.

8. The light emitting assembly according to claim 7, wherein:
    the light emitting assembly further comprises a fluorescent layer on surfaces of the first wafer and the second wafer.

9. The light emitting assembly according to claim 7, wherein:
    each of the at least one light emitting diode further comprises a bracket, and each of the at least one light emitting diode is connected to the circuit board through the bracket.

10. The light emitting assembly according to claim 7, wherein each of the at least one light emitting diode further comprises a package structure for packaging the first wafer and the second wafer.

11. The light emitting assembly according to claim 10, wherein the package structure is a packaging adhesive.

12. A light emitting assembly according to claim 9, wherein the bracket is made of a conductive material.

13. A backlight source comprising the light emitting assembly according to claim 1.

14. A display panel comprising the backlight source according to claim 13.

15. A light emitting diode comprising a main light emitting face and a side light emitting face, wherein the side light emitting face is an encirclement of at least three light emitting sub-faces inclined with respect to the main light emitting face, the side light emitting face and the main light emitting face are together of a substantially truncated pyramid shape, wherein the main light emitting face is a larger one of two bottom faces of the truncated pyramid shape.

16. The light emitting diode according to claim 15, wherein a fluorescent layer is provided on the main light emitting face and the side light emitting face.

17. The light emitting diode according to claim 15, further comprising a bracket disposed on a smaller one of the two bottom surfaces of the truncated pyramid shape, the light emitting diode being connected to the circuit board by the bracket.

18. The light emitting diode according to claim 15, further comprising a package structure for packaging the main light emitting face and the side light emitting face.

19. The light emitting diode according to claim 15, further comprising a first wafer and a second wafer, the first wafer being disposed on the main light emitting face and the second wafer being disposed on the side light emitting face.

20. The light emitting diode according to claim 19 wherein the first wafer and the second wafer are in one unitary piece.

* * * * *